(12) United States Patent
Graham et al.

(10) Patent No.: US 9,619,977 B2
(45) Date of Patent: Apr. 11, 2017

(54) DEPLOYABLE BEACON

(71) Applicant: TRIDENT HOLDING, LLC, Sedalia, CO (US)

(72) Inventors: James D. Graham, Castle Rock, CO (US); Timothy R. Brown, Sedalia, CO (US)

(73) Assignee: TRIDENT HOLDING, LLC, Sedalia, CO (US)

( * ) Notice: Subject to any disclaimer, the term of this patent is extended or adjusted under 35 U.S.C. 154(b) by 0 days.

(21) Appl. No.: 14/837,220

(22) Filed: Aug. 27, 2015

(65) Prior Publication Data

US 2017/0061748 A1    Mar. 2, 2017

(51) Int. Cl.
    *G08B 21/00* (2006.01)
    *G08B 5/00* (2006.01)

(52) U.S. Cl.
    CPC .................... *G08B 5/002* (2013.01)

(58) Field of Classification Search
    CPC ..................................... G08B 5/002
    USPC ........................................ 340/946
    See application file for complete search history.

(56) References Cited

U.S. PATENT DOCUMENTS

| | | | | |
|---|---|---|---|---|
| 3,727,229 A | * | 4/1973 | Clinger | H01Q 1/28 116/210 |
| 3,962,537 A | | 6/1976 | Kearns et al. | |
| 4,267,562 A | | 5/1981 | Raimondi | |
| 4,586,456 A | * | 5/1986 | Forward | B63C 9/20 116/210 |
| 4,836,128 A | * | 6/1989 | Walker | B64B 1/50 116/210 |
| 4,872,414 A | * | 10/1989 | Asquith | B64B 1/50 116/210 |
| 5,095,845 A | * | 3/1992 | Murphy | B64B 1/50 116/210 |
| 5,515,061 A | * | 5/1996 | Hiltz | G01S 1/68 342/385 |
| 5,561,557 A | | 10/1996 | Le Bris et al. | |
| 5,582,127 A | * | 12/1996 | Willis | B64B 1/40 116/210 |
| 5,905,943 A | | 5/1999 | Wiedeman et al. | |
| 5,927,648 A | | 7/1999 | Woodland | |
| 6,056,237 A | | 5/2000 | Woodland | |
| 6,069,584 A | | 5/2000 | Johnson | |
| 6,098,547 A | | 8/2000 | West | |
| 6,125,260 A | | 9/2000 | Wiedeman et al. | |

(Continued)

FOREIGN PATENT DOCUMENTS

| | | | | |
|---|---|---|---|---|
| FR | 2957680 A1 | * | 9/2011 | ............ B64D 25/20 |
| WO | 2004057263 | | 7/2004 | |
| WO | 2007104152 | | 9/2007 | |

OTHER PUBLICATIONS

Sean McCoy, 'Rescue Me' Balloon as Distress Signal, Nov. 21, 2014, www.gearjunkie.com/rsucue-me-balloon-distress-signal.*

*Primary Examiner* — Eric M Blount
(74) *Attorney, Agent, or Firm* — Regan L. Trumper; William W. Cochran; Cochran Freund & Young LLC (57) ABSTRACT

Disclosed is a system and method for a rapid deployment beacon that may be hand-held. A rapidly deployable untethered beacon device will gain elevation while transmitting an emergency, or other, beacon and location signal is enabled to clear obstructions such as terrain and buildings in order to extend the communications range of said beacon.

16 Claims, 7 Drawing Sheets

(56) References Cited

U.S. PATENT DOCUMENTS

| | | | |
|---|---|---|---|
| 6,195,039 B1 * | 2/2001 | Glass, Jr. | B63C 9/0005 342/357.75 |
| 6,317,080 B1 * | 11/2001 | Baxter, Jr. | G01N 1/2273 244/31 |
| 6,347,764 B1 | 2/2002 | Brandon et al. | |
| 6,359,568 B1 * | 3/2002 | Johnson | B63C 9/21 116/210 |
| 6,477,979 B1 * | 11/2002 | Sanchez | B64B 1/50 116/210 |
| 6,764,041 B2 | 7/2004 | Oron | |
| 7,154,275 B2 | 12/2006 | Zank et al. | |
| 7,286,913 B2 | 10/2007 | Bodin et al. | |
| 7,349,544 B2 | 3/2008 | Tiwari | |
| D573,939 S | 7/2008 | Las Heras | |
| D596,267 S | 7/2009 | Colgren et al. | |
| 7,679,037 B2 | 3/2010 | Eden et al. | |
| 7,844,218 B2 * | 11/2010 | Seligsohn | H04B 7/18502 244/31 |
| 7,886,682 B1 * | 2/2011 | Germain | B64B 1/50 116/210 |
| 8,001,901 B2 | 8/2011 | Bass | |
| 8,001,902 B2 | 8/2011 | Bass | |
| 8,055,206 B1 | 11/2011 | Bass | |
| 8,215,236 B2 | 7/2012 | Bass | |
| 8,744,492 B2 | 6/2014 | Kuo | |
| 8,750,156 B1 | 6/2014 | Carbajal | |
| 8,780,968 B1 | 7/2014 | Garcia et al. | |
| 8,787,836 B1 | 7/2014 | Carbajal | |
| 8,798,548 B1 | 8/2014 | Carbajal | |
| 8,805,292 B1 | 8/2014 | Carbajal | |
| 8,824,536 B1 | 9/2014 | Garcia et al. | |
| 8,917,175 B2 * | 12/2014 | O'Regan | G01S 5/0027 340/539.1 |
| 8,942,938 B2 | 1/2015 | Bishop | |
| 9,338,755 B2 * | 5/2016 | Nam | H04W 52/283 |
| 2003/0164794 A1 | 9/2003 | Haynes et al. | |
| 2004/0196367 A1 | 10/2004 | Raymond et al. | |
| 2005/0051667 A1 | 3/2005 | Arlton et al. | |
| 2006/0283345 A1 | 12/2006 | Feldman et al. | |
| 2007/0200927 A1 | 8/2007 | Krenik | |
| 2008/0059452 A1 | 3/2008 | Frank | |
| 2008/0191924 A1 | 8/2008 | Duff et al. | |
| 2009/0081943 A1 | 3/2009 | Dobyns et al. | |
| 2010/0270425 A1 | 10/2010 | Zur | |
| 2011/0017863 A1 | 1/2011 | Goossen et al. | |
| 2011/0065375 A1 | 3/2011 | Bradley | |
| 2013/0090874 A1 | 4/2013 | Bishop | |
| 2013/0291787 A1 * | 11/2013 | Broussard, Jr. | B64B 1/50 116/201 |
| 2015/0161857 A1 * | 6/2015 | Aguilar | G08B 5/002 116/210 |

* cited by examiner

DEPLOYABLE BEACON

FIELD OF THE INVENTION

The present invention relates generally to a deployable beacon.

BACKGROUND OF THE INVENTION

A crucial application for radio frequency (RF) transmitters and other beacon type devices is the location of persons in need of assistance, i.e. survivors of plane crashes, shipwrecks or other emergency situations. Rescue devices of this type emit radio signals and/or visual signals which allow a rescue team to converge on the location of the user. Often, these devices are fixed components of aircraft and ships. Alternatively, survival packs, which contain equipment for sending distress signals are often included in survival gear. For example, on military aircraft the pilot is equipped with a radio which automatically emits an RF signal upon the pilot ejecting from the plane. The radio is worn directly on the survival vest of the pilot.

Also, individuals may find themselves in distressed conditions. In many instances, the site of the distress may be in an area that inhibits radio or other communication transmission.

SUMMARY OF THE INVENTION

An embodiment of the invention may therefore comprise an untethered deployable inflatable communications device, the device comprising a housing assembly, wherein the housing assembly comprises a first section, a second section and a lid assembly, and wherein the first section is separated from the second section by a stabilizer, an airborne assembly, the airborne assembly comprising an inflatable balloon and a communications device, a gas cylinder enabled to pressurize the inflatable balloon, a processor and a start lever enabled to activate the gas cylinder to inflate the balloon wherein the inflated balloon is enabled to displace at least part of the lid assembly, wherein when a pressure in the inflated balloon reaches a pre-determined level the airborne assembly is disconnected from the housing assembly and the airborne assembly elevates.

An embodiment of the invention may further comprise a method of deploying an untethered communications device, the method comprising, in a housing assembly comprising a first compartment, a second compartment separated by a stabilizer and a lid assembly, housing an airborne assembly comprising a folded inflatable balloon and a communications device comprising a processor, pressurizing the balloon with a gas cylinder so that the balloon inflates and displaces at least a part of the lid assembly, the displaced part of the lid assembly comprising a frangible end cover for the housing assembly, via a regulator comprising an transducer, sensing the pressure in the gas cylinder, via the transducer, sending a signal to the processor that the pressure in the gas cylinder is at a pre-determined level, via the processor, sending a signal to a solenoid, via the solenoid, disconnecting the airborne assembly.

DETAILED DESCRIPTION OF THE EMBODIMENTS

For purposes of promoting an understanding of the principles of the invention, reference will not be made to the embodiments illustrated in the drawings. The embodiments disclosed below are not intended to be exhaustive or limit the invention to the precise form disclosed in the following detailed description. Rather, the embodiments are chosen and described so that others skilled in the art may utilize their teachings. It will be understood that not limitation of the scope of the invention is thereby intended. The invention includes any alterations and further modifications in the illustrated devices and described methods and further applications of the principles of the invention which would normally occur to one skilled in the arts to which the invention relates.

In an embodiment of the invention, a fly-away payload is provided. The fly-away payload may comprise a GPS (Global Positioning System) device, a radio transceiver, a quick disconnect mechanism, a riser tube. OPS mounts, and a balloon. The elements comprising the invention may be housed in a housing assembly with a lid assembly. The housing assembly may also comprise a start lever, a start switch and a button extension.

Generally, an embodiment of the invention comprises a rapid deployment beacon that is hand-held. The beacon device is self-elevating and, once deployed, will gain elevation while transmitting an emergency, or other type signal, beacon and location information (Mil grid or Latitude/Longitude, for example). The beacon device will clear nearby obstructions such as terrain and buildings in order to extend the communications range and notify response personnel of individuals or groups in distress.

Figure 1:
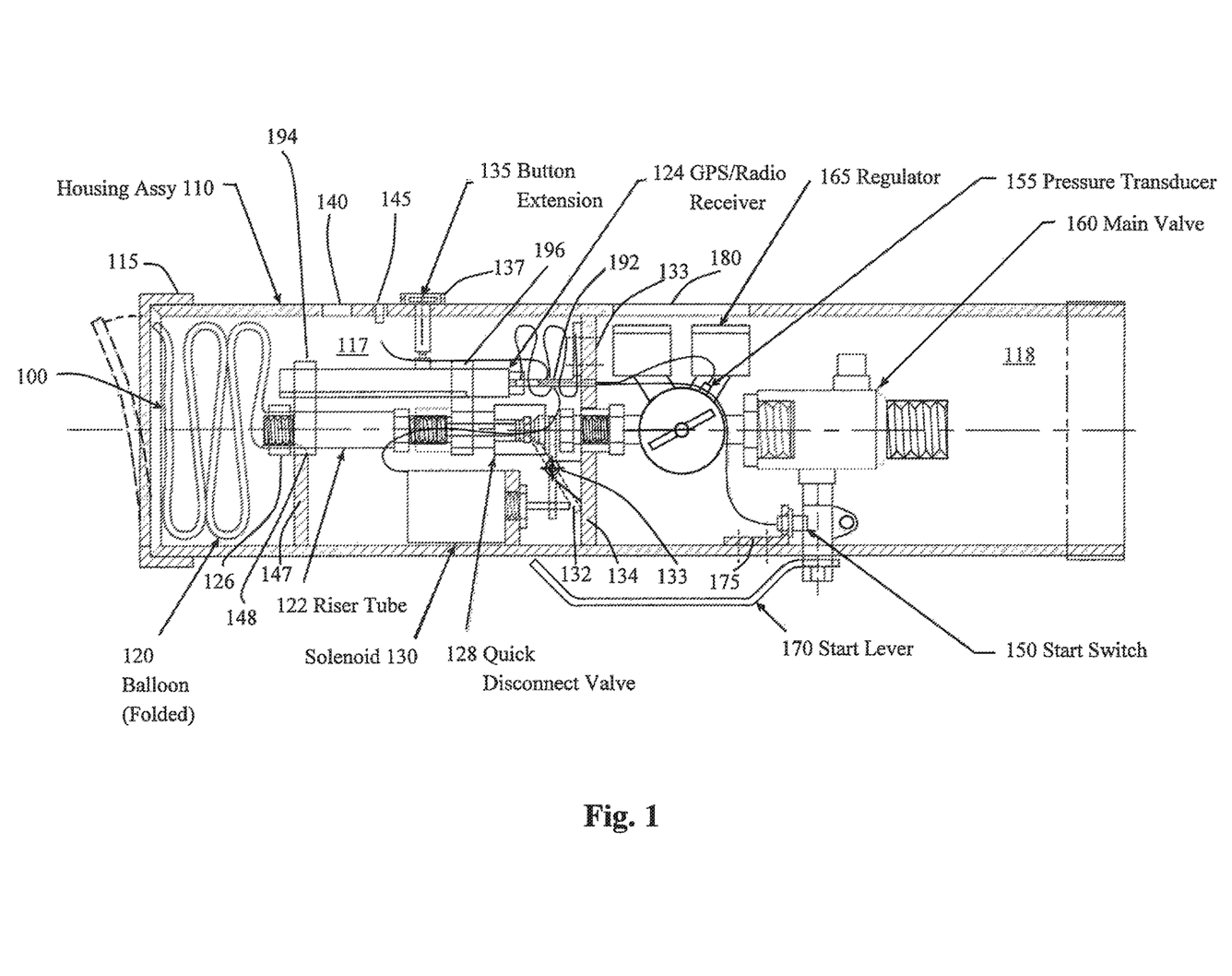
FIG. 1 shows a rapid deploy beacon.

FIG. 1 shows a rapid deploy beacon. A housing assembly 110 is shown with a lid assembly 115. The housing assembly 110 comprises a front section 117 and a back section 118. The lid assembly 115 engages the front section of the housing assembly 110. The lid assembly 115 may engage the housing assembly 110 in any manner that may facilitate the removal of the lid assembly 115. For instance, the lid assembly 115 may snugly fit around the external circumference of the housing assembly 110. Such an engagement enables the removal of the lid assembly 115 by an internal force from the front section 117 of the housing assembly. The lid assembly 115 may also engage the housing assembly 110 in a manner that requires an operator to perform an operation to allow the lid assembly 117 to be removed. Such an operation may be a slight unscrewing, or removal of a latch, to allow the lid assembly 117 to be removed. It is understood that the removal of the lid may be performed in any manner that allows for the deployable beacon to operate consistent with that described in this description. The housing assembly 110 also comprises a stabilizer donut 133. The stabilizer donut 133 has access hole in its middle and otherwise separates the front section 117 from the back section 118.

The housing assembly 110 may be constructed of a high-impact plastic, or composite material for example, that provides a minimal radio frequency (RF) interference. It is understood that any material may be utilized that provides a light weight and minimal RF interference. As discussed herein, the lid assembly 115 may comprise an outer ring and a pull-tab and may be constructed of a high impact plastic, or composite.

The front section. 11.7 of the housing assembly 110 houses an airborne assembly 100. The airborne assembly comprises a balloon 120, a riser tube 122, a GPS/radio transceiver 124 which may include GPS mounts, a clamp band-balloon 126 and a quick disconnect valve 128. The front section 117 may further house a solenoid. The housing assembly 110 may comprise a button extension 135 and an associated button shield 137, a message view port 140, a USB port 145, a front stabilizer 147 and a stabilizer wedge 148.

In the front section, the balloon 120 is folded and uninflated. The balloon connects to the riser tube 122. The riser tube 122 is held in place by the stabilizer 147. The riser tube rests on the stabilizer wedge 148. The balloon 120 may be connected to the riser tube 126 via the clamp band-balloon 126. The clamp band-balloon 126 will keep the balloon 120 connected to the riser tube after the balloon 120 is inflated and becomes airborne. The riser tube 122 connects to the quick disconnect valve 128. The solenoid 130 is engagable to a release switch 132 and is connected electrically to an electrical assembly 192. The release switch 132 is enabled to activate the quick disconnect valve 128, which as described in regard to further figures in the description, will release the airborne assembly 100. Further, the release switch 132 is held in position by a release link mount 133 which is connected to the stabilizer donut 134. The band balloon clamp 126 may be constructed of stainless steel or other material that provides the strength to retain the balloon to the rest of the airborne assembly 100 and provide impact resistance and durability. Those skilled in the art will understand the available materials to construct clamps that provide durability and strength while maintaining weight limitations.

The GPS/Radio transceiver 124 is connected to the riser tube 122 at one end of the GPS/radio transceiver 124 by a forward GPS mount 194 and at the other end of the GPS/radio transceiver 124 by a rear GPS mount 196 to the quick disconnect valve 128. The forward GPS mount 194 and the rear OPS mount 196 keep the GPS/radio transceiver 124 connected to the airborne assembly 100 during deployment. It is understood that the GPS/radio transceiver may connect to the airborne assembly 100 by other means. In the embodiment shown, the forward GPS mount 194 and the rear GPS mount 196 maintain a separation from the respective riser tube 122 and quick disconnect valve 128 to eliminate possible interference with the communications capabilities of the GPS/radio transceiver 124.

The GPS/radio transceiver 124 is further positioned to be engagable by the button extension 135. The GPS/radio transceiver 124 also connects to the electrical assembly 192 and to the USB port 145. This enables the GPS/radio transceiver 124 to receive and transmit data via the USB port 145 to a user. The USB port 145 allows the user to program the GPS/radio transceiver 124 if necessary. The USB port 145 may also allow the user to charge the battery prior to deployment.

The back section 118 may house a start switch 150, a pressure transducer 155, a main valve 160, a regulator 165, and a helium cylinder (not shown in FIG. 1). The back section 118 may comprise a start lever 170, a switch mount 175, and a pressure viewpoint 180. The main valve 160 is connectable to a helium cylinder 200 (described below in connection with FIG. 2). The main valve 160 also connects to the regulator 165. The regulator 165 connects to the quick disconnect valve 128 through the access hole in the stabilizer donut 134. The start lever 170 is rotatable, or may be leveraged upward away from the housing assembly 110, to engage the start switch 150. Activation of the start lever 170 will engage the main valve 160 and the gas regulator 165 to begin inflation of the balloon 120. The regulator 165 will monitor the pressure in the balloon 120 until it is filled to a pre-determined pressure. The user may also monitor the pressure regulator 165 via the pressure window 180. The pressure view port 180 may be comprised of a clear plastic or other material that provides a means to see into the interior of the housing assembly as well as provide impact resistance.

Figure 2:
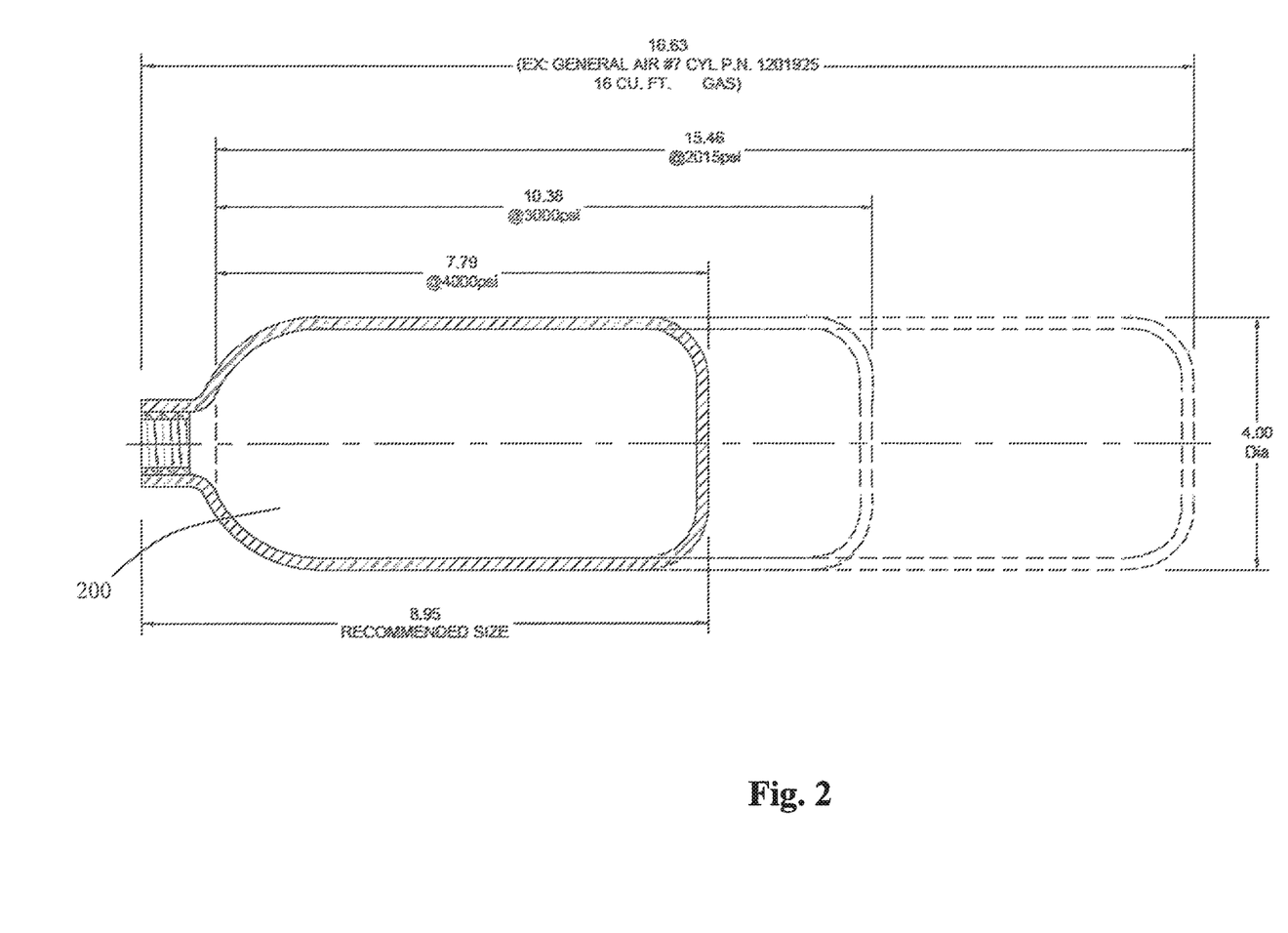
FIG. 2 shows Gas Cylinders.

FIG. 2 shows gas Cylinders. A gas cylinder 200 is enabled to engage with the main valve 160 of FIG. 1. The gas cylinder 200 may engage with the main valve 160 by any means. For instance, the gas cylinder 200 may screw onto, or otherwise engage, the main valve 160. Screw threads are shown on the main valve 160. Those skilled in the art will understand the means by which a cylinder may connect to a valve. The gas cylinder 200 may be of a variety of pressures and lengths. For instance, the gas cylinder 200 may be of a 4 inch diameter, 7.79 inches in length and be pressurizable to 4000 psi. The gas cylinder 200 may be 10.38 inches in length and be pressurizable to 3000 psi. The gas cylinder 200 may be 15.46 inches in length and be pressurizable to 2015 psi. It is understood that the dimensions of the gas cylinder and pressurized limits are selectable by a user or organization. The dimensions and limits described above are not exhaustive of usable gas cylinder sizes. The gas cylinder 200 may be comprised of an aluminum, stainless steel or titanium material. Those skilled in the art will understand useable materials for gas cylinder construction that provide durability, impact resistance and light weight characteristics. A gas used in a gas cylinder 200 is understood to be a gas that is lighter than air. Accordingly, a balloon inflated with such a gas will tend to elevate. Those skilled in the art will understand the gases utilizable in connection with a gas cylinder 200. The gas in the gas cylinder 200 is also preferably non-flammable. Accordingly, for example, hydrogen may be used as a gas but is not preferable due to its flammability.

Figure 3:
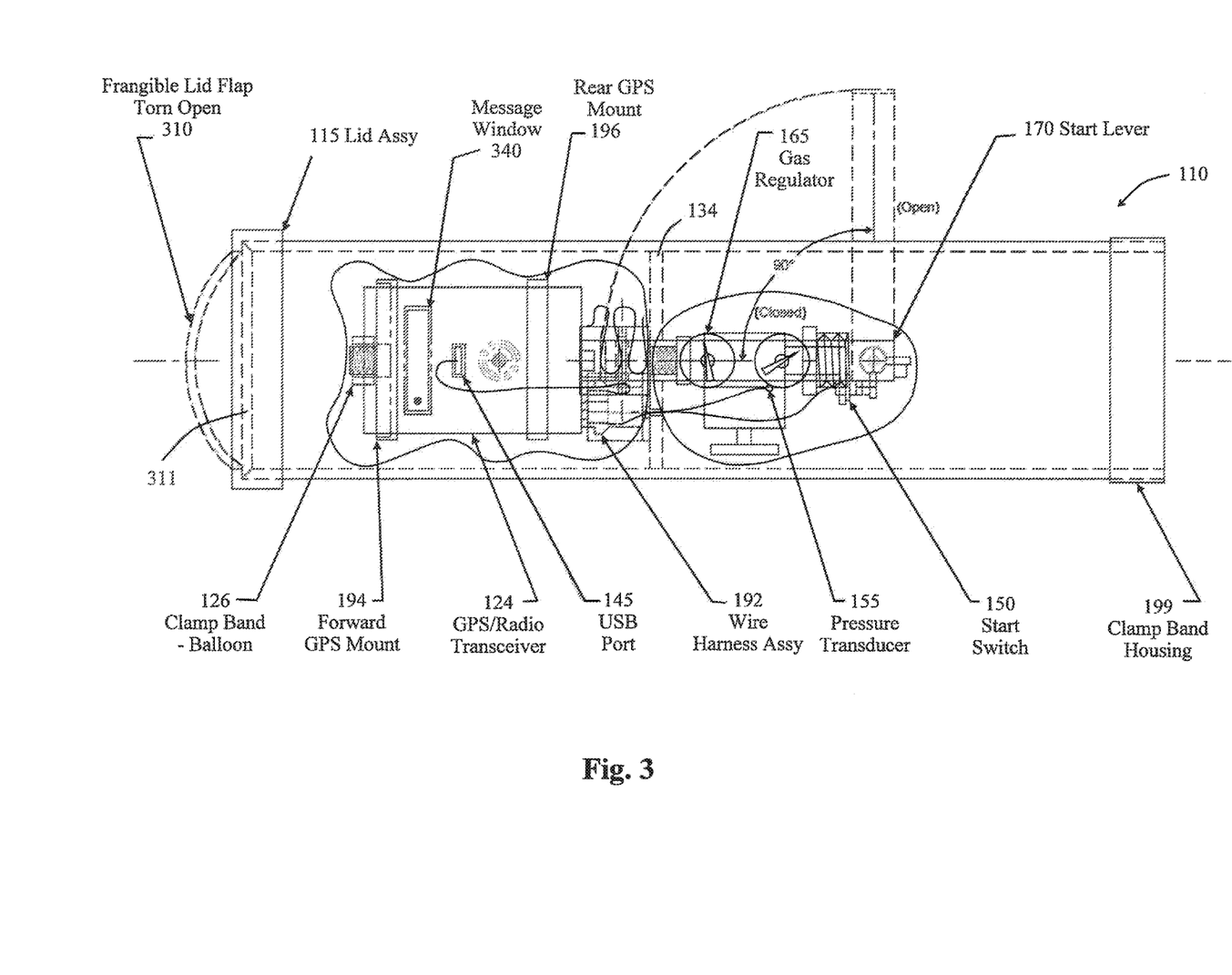
FIG. 3 shows a top view of a rapid deploy beacon.

FIG. 3 shows a top view of a rapid deploy beacon. In the embodiment shown, the GPS/radio transceiver 124 is held in place by the forward GPS mount 194 and the rear GPS mount 196. The balloon is not shown in FIG. 3. The lid assembly 115 encases the end of the housing assembly 110. Also shown is a frangible lid flap 310 in a torn open position. A frangible lid flap is also shown in a initial position 311. The frangible lid flap 310 covers the end of the housing assembly 110 and is torn open by expansion of the balloon (not shown in FIG. 3). The frangible lid flap 310 may be comprised of a rubber or other material that provides sufficient protection to the contents of the housing assembly 110 but which also is displaceable by a filled balloon 720 (see FIG. 7).

The GPS/radio transceiver 124 is readable through the housing assembly 110 via the message view port 140. The message window 340 of the GPS/radio transceiver 140 can be seen through the message view port 140 in the housing assembly 110. The USB port 145 is accessible through the housing assembly 110. The wiring harness assembly 192

(also referred to herein as the electrical assembly) connects to the GPS/radio transceiver 124. The message view port 140 may be comprised of a clear plastic or other material that provides a means to see into the interior of the housing assembly as well as provide impact resistance.

The gas regulator 165 is show in the back section 118 of the housing assembly 110. The gas regulator 165 connects to the airborne assembly 100 in the front section 117 via the hole in the stabilizer donut. The start lever 170 is shown in the open position connected to the start switch. A clamp band-housing 199 is shown around the end of the housing assembly 110 distal from the lid assembly 115.

Figure 4:
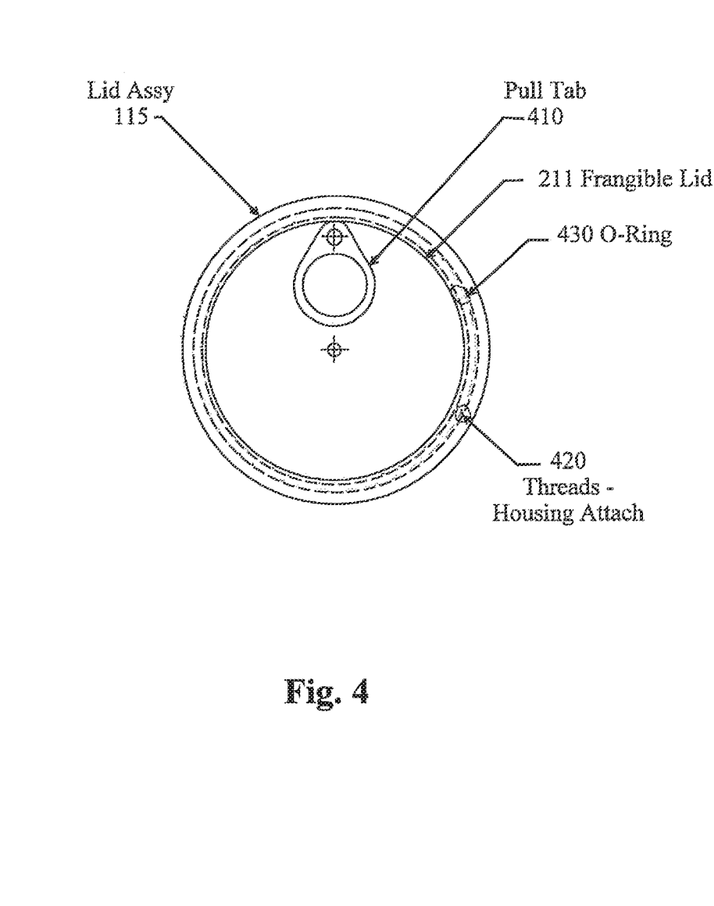
FIG. 4 shows a sectional view of the housing assembly from the lid assembly.

FIG. 4 shows a sectional view of the housing assembly from the lid assembly. As shown in the embodiment of FIG. 4, the housing assembly is circular and the lid assembly 115 is shown covering the end of the front section 117. The lid assembly 115 may have a pull tab 410 which enables the frangible flap 310 (which may be referred to as a frangible cover) to be removed. The lid assembly 115 may also be connected via threads-housing 420. An o-ring 430 is shown under the lid assembly 115. The o-ring 430 provides a seal to the interior of the housing assembly 110.

Figure 5:
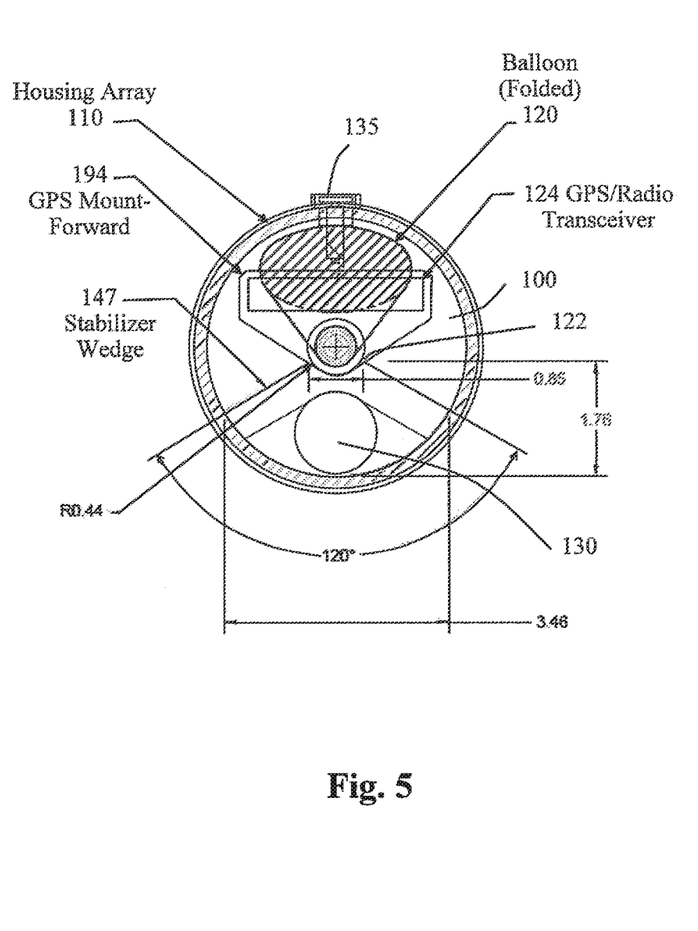
FIG. 5 shows a sectional view of the interior of the front section 117.

FIG. 5 shows a sectional view of the interior of the front section 117. The folded balloon 120 is shown atop the rest of the airborne assembly 100 within the housing assembly 110. The GPS/radio transceiver 124 is held in position by the forward GPS mount 194. The button extension 135 is positioned to engage the GPS/radio transceiver 124. The solenoid 130 is shown below the airborne assembly 100. The stabilizer wedge 147 hold the riser tube 122 which connects as described to the rest of the airborne assembly 100.

Figure 6:
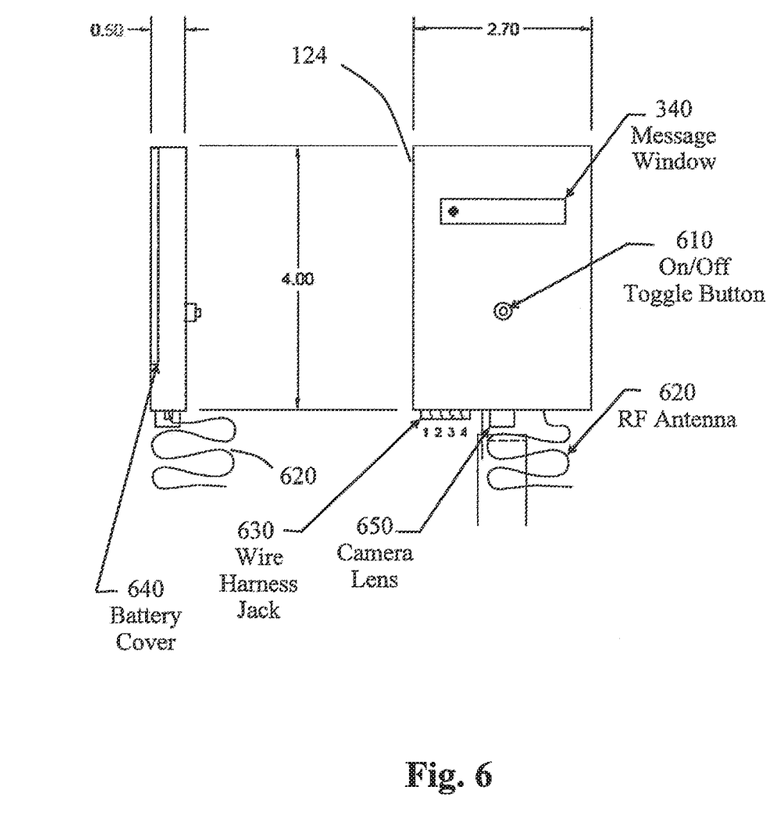
FIG. 6 shows the GPS/radio transceiver.

FIG. 6 shows the GPS/radio transceiver. The GPS/radio transceiver 124 is shown with a message window 340, an on/off button 610, an RF antenna 620, a camera lens 650, a wire harness jack 630 and a battery cover 640. The message window 340 is viewable through the message viewport 140 in the housing assembly 110. The on/off button 610 is positioned in the front section 117 of the housing assembly 110 so that the button extension can engage it. A user can use the button extension to turn the GPS/radio transceiver 124 on and off. The RE antenna connects to the GPS/radio transceiver 124 and is enabled to transmit, and receive, radio transmissions. The camera lens 650 connects to a camera (not shown) inside the GPS/radio transceiver 124 and is enabled to provide images to the camera inside the GPS/radio transceiver 124. The images may be transmitted via the GPS/radio transceiver 124. A battery cover 640 covers a battery inside the GPS/radio transceiver 124.

The GPS/radio transceiver 124 may have a variety of functionalities and capabilities. The GPS/radio transceiver 124 may have a broadcast range of up to or beyond 5 miles, such as 70 miles, for example. The range of the GPS/radio transceiver 124 depends on various factors as those skilled in the art understand. The GPS/radio transceiver 124 may have an emergency audio message, which may be pre-recorded or which may be recorded by a user just prior to deployment. The frequency that the GPS/radio transceiver 124 transmits on may be pre-determined or may be changeable by a user. The GPS/radio transceiver 124 may have a flash memory of any size, 5 MB for example. A function may provide for the electronics of the GPS/radio transceiver 124 to burn out upon a pre-determined low battery level. In certain security situations, this allows the GPS/radio transceiver 124 to destroy any valuable information that may otherwise fall into control of an opposition. GPS/radio transceiver 124 may have a 1-way or a 2-way radio. The GPS/radio transceiver 124 may have a camera which operates at a pre-determined optical performance depending on the characteristics of the model utilized. For instance, the camera may be a 1080 pixel HD video recording camera operating at 15 fps per min. The camera may also be enabled to take still photographs for transmission. The video may transmit on a pre-determined frequency, such as every 5 minutes and then a repeat transmission. A GPS position transmission period of the GPS/radio transceiver 124 can be set to any time period, such as 0.5 seconds or 5.0 seconds. The GPS initial and current positions can be transmitted alternately. As such, the initial position may be transmitted on odd numbered transmissions and the current positions may be transmitted on even numbered transmissions. The GPS data may be transmitted by the GPS/radio transceiver 124 on emergency frequency of 121.1 MHz, 243 MHz and/or 406 MHz. The GPS data may also be transmitted by the GPS/radio transceiver 124 on a pre-determined other frequency. Depending on the context of the deployment, the broadcast strength may be variable. It is understood that the higher the broadcast strength, the shorter the battery life. The GPS/radio transceiver 124 may be constructed of shock resistant materials that provide protection up to a pre-determined amount of g forces. The GPS/radio transceiver 124 may be constructed of materials that provide vibration resistance up to a pre-determined dB's. The GPS/radio transceiver 124 may be constructed of materials that provide a pre-determined operational temperature range. The GPS/radio transceiver 124 may accept interfering radio frequency (RF) transmissions per FCC regulations. The GPS/radio transceiver 124 may have a smartphone app or PC program interface for setting frequencies, recording messages and setting parameters that are variable. The GPS/radio transceiver 124 may also not provide GPS capabilities. The GPS/radio transceiver 124 may provide radio and/or camera capabilities without GPS location information. In certain conditions, this may allow the device of the invention to be incased in a smaller and lighter encasement. For instance, if the location of a user is known to response personnel, it is not necessary that the user be enabled to provide location information. As such, a device provided to such a user would not include the GPS functionality.

Figure 7:
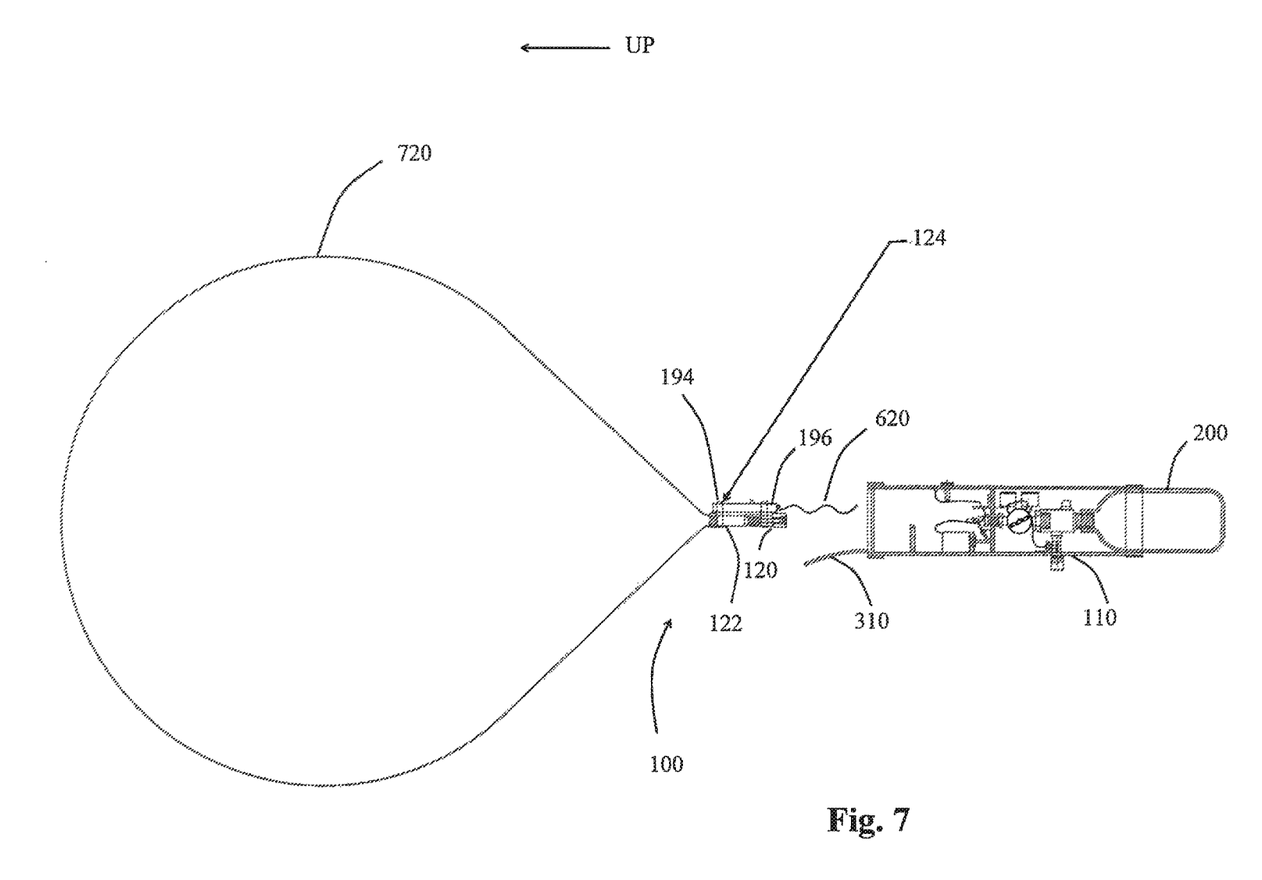
FIG. 7 shows a deployed airborne assembly.

FIG. 7 shows a deployed airborne assembly. In an embodiment of the invention, the balloon 720 is inflated with gas from the gas cylinder 200. The inflated balloon 720 will elevate due to the gas and carry the airborne assembly upward. The riser tube 122, GPS/radio transceiver 124, forward GPS mount 194, rear GPS mount 196, antenna 620 and quick disconnect valve 128, as part of the airborne assembly 100, elevate with the inflated balloon 720. The housing assembly 110 and the gas cylinder 200 do not elevate with the airborne assembly. The balloon 720 (and shown in FIG. 1 as a folded balloon 120) may be constructed of a nylon mesh or other inflatable and durable material, such as the materials used to construct automobile airbags. Those skilled in the art will understand the available materials for use in constructing balloons that are resistance to damage, may be puncture resistant and are inflatable to pre-determined pressures.

Figure 8:
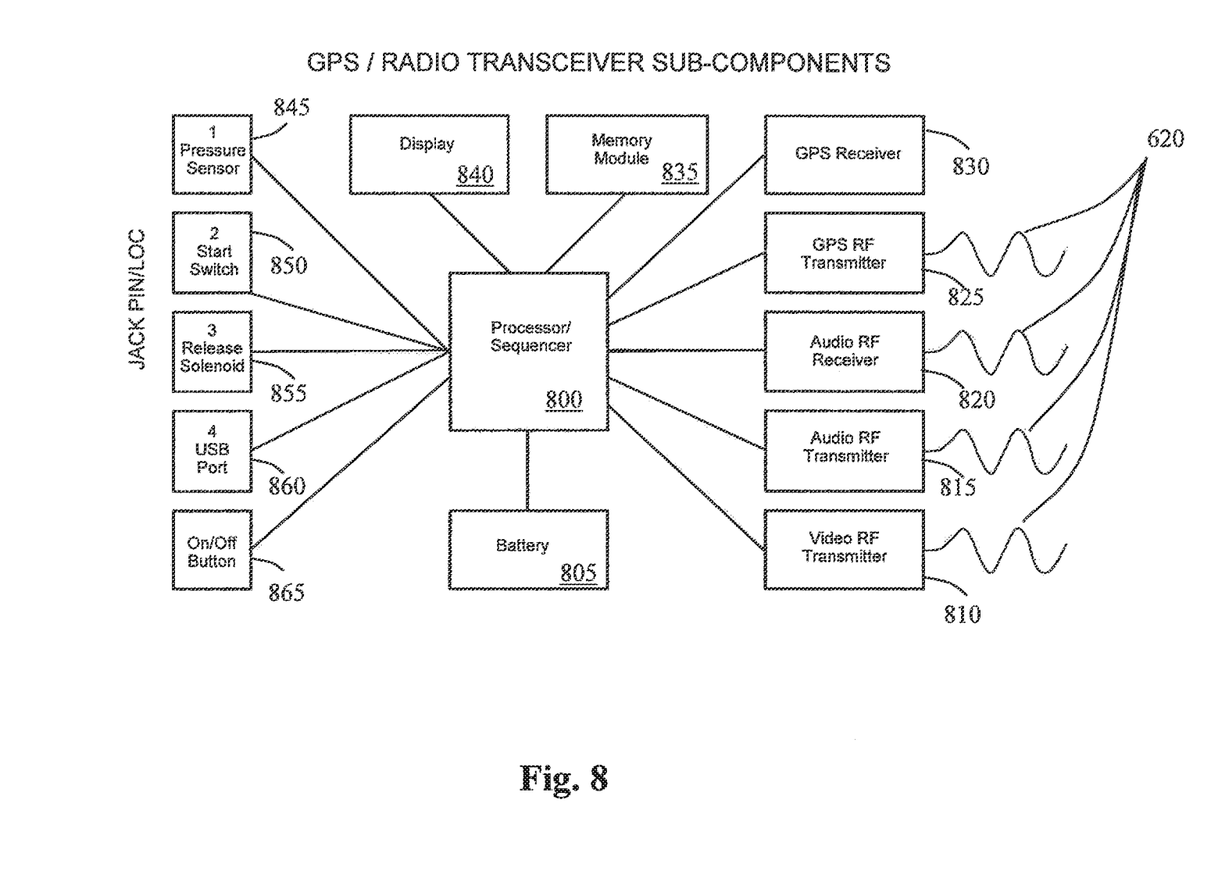
FIG. 8 shows (IPS/Radio transceiver and connected subcomponents.

FIG. 8 shows GPS/Radio transceiver and connected sub-components. The (WS/radio transceiver 124 may comprises a plurality of components and sub-components. The GPS/radio transceiver may comprise a processor/sequencer 800, a battery 805, a video RF transmitter 810 connected to an antenna 620, an audio RF transmitter connected to an antenna 620, an audio RF receiver 820 connected to an antenna 620, a GPS RF transmitter 825 connected to an antenna 620, a GPS receiver 830, a memory module 835, and a display 840. A plurality of other components may communicate with, or receive communications or input in the system of the invention. The processor/sequencer may receive inputs from a pressure sensor 845, the start switch 850, the release solenoid 855, the USB port 860 and the on/off button 865. The on/off button 865 is used to turn the GPS/radio transceiver 124 on and off for use by a user, or other programmer, prior to activation of the airborne device. The processor/sequencer 800 of the GPS/radio transceiver 124 performs a number of functions. These functions include, but are not limited to, activation based on input from the start switch 850, sensing the battery voltage, activating the GPS signal receiver, starting sensing the gas cylinder pressure, sensing remaining pressure in the gas cylinder, activating the release solenoid, activating the GPS RF transmitter, starting sending GPS data, Activating the audio RF transmitter, starting sending an audio signal, activating the RF receiver, starting receiving an audio signal, activating the video RF transmitter, starting sending a video signal, sensing low battery voltage, for example 10% battery voltage, activating burn-out processes.

In an embodiment of the invention, a user can deploy the airborne assembly 100 in an emergency situation, or other situation where an increased communications distance is required. The start lever 170 is turned 90 degrees clockwise (looking down at the start lever 170). It is understood that the start lever 170 may be turned in another fashion to begin the process of deploying the airborne assembly 100. The start lever 170 engages the start switch 150 and activates the main valve 160 and the gas regulator 165. The start switch 150 also activates the GPS/radio transceiver 124 via a connection by wire. The balloon 120 will inflate. The lid assembly 115 may have been previously removed by the user. The inflating balloon 720 will push through the frangible cover 310, thus displacing the frangible cover 310 allowing the balloon 720 to continue to inflate and expand. The user depresses the button extension 135 which engages the on/off button 610 on the GPS/radio transceiver 124. Depending on the characteristics of the GPS/radio transceiver 124, this may start the GPS transceiver, the radio and the camera. The pressure transducer 155 senses the pressure remaining on the high pressure side. For instance, the pressure transducer 155 will sense when there is 100 psi remaining in the high-pressure side. The transducer will send a signal through the electrical assembly 192 that activates the solenoid 130. The activated solenoid 130 will rotate the release switch 132 which in turn activates the quick release valve 128. The signaling and sequence of steps in the release of the airborne assembly is controlled by the GPS/radio transceiver.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An untethered and free floating deployable inflatable communications device, said device comprising:
   a housing assembly, wherein said housing assembly comprises a first compartment, a second compartment and a lid assembly, and wherein said first compartment is separated from said second compartment by a stabilizer;
   an airborne assembly, said airborne assembly comprising an inflatable balloon and a communications device, said communications device being enabled to transmit historical and current location information, said historical information comprising GPS location information at a deployment location;
   a gas cylinder enabled to pressurize said inflatable balloon;
   a programmable processor; and
   a start lever enabled to activate the gas cylinder to inflate said balloon wherein said inflated balloon is enabled to displace at least part of said lid assembly;
   wherein when a pressure in said gas cylinder reaches a pre-determined level said airborne assembly is disconnected from said housing assembly and said gas cylinder, and said airborne assembly elevates.

2. The untethered deployable inflatable communications device of claim 1, wherein said communications device comprises a GPS radio frequency transmitter and an audio radio frequency transceiver.

3. The untethered deployable inflatable communications device of claim 2, wherein said communications device further comprises a camera and a video radio frequency transmitter.

4. The untethered deployable inflatable communications device of claim 1, wherein said gas cylinder is a lighter than air gas cylinder.

5. The untethered deployable inflatable communications device of claim 1, wherein said gas cylinder is a helium cylinder.

6. The untethered deployable inflatable communications device of claim 1, said device further comprising a solenoid, a gas regulator, and a valve, wherein said valve is a quick disconnect valve, and wherein said gas regulator is enabled to sense the pressure in the gas cylinder and send a signal through the processor and said solenoid is enabled to receive a signal from said processor to disconnect the airborne assembly.

7. The untethered deployable inflatable communications device of claim 6 wherein said gas regulator comprises a transducer.

8. The untethered deployable inflatable communications device of claim 1 wherein said communications device comprises an on/off button and said housing assembly comprises a button extension enabled to engage said on/off button.

9. The untethered deployable inflatable communications device of claim 1 wherein said communications device comprises an antenna.

10. The deployable inflatable communications device of claim 1, wherein said device further comprises:
    a solenoid;
    a gas regulator comprising a transducer; and
    a valve,
    wherein:
       said communications device comprises a GPS radio frequency transmitter, an audio radio frequency transceiver, a camera, an on/off button and a video radio frequency transmitter;
       said housing assembly comprises a button extension enabled to engage said on/off button;
       said gas cylinder is a helium cylinder; and
       said valve is a quick disconnect valve, wherein said gas regulator is enabled to sense the pressure between the gas cylinder and the balloon and send a signal through the processor and said solenoid is enabled to receive a signal from said processor to disconnect the airborne assembly.

11. A method of deploying an untethered and free floating communications device, said method comprising:

in a housing assembly comprising a first compartment, a second compartment separated by a stabilizer and a lid assembly, housing an airborne assembly comprising a folded inflatable balloon and a communications device comprising a programmable processor, wherein said communications device is enabled to transmit historical and current location information, said historical information comprising GPS location information at a deployment location;

pressurizing said balloon with a gas cylinder so that said balloon inflates and displaces at least a part of said lid assembly, said displaced part of said lid assembly comprising a frangible end cover for said housing assembly;

via a regulator comprising a transducer, sensing the pressure in said gas cylinder;

via said transducer, sending a signal to said processor that said pressure in said gas cylinder is at a pre-determined level;

via said processor, sending a signal to a solenoid, via said solenoid, disconnecting said airborne assembly from said housing assembly and from said gas cylinder.

12. The method of claim 11, wherein said communications device is a GPS (Global Positioning System) and radio frequency transceiver and said method further comprises, via said communications device, sending GPS and radio frequency data to a third party.

13. The method of claim 12, wherein said communications device further comprises a camera and said method further comprises sending video data to said third party.

14. The method of claim 11, wherein said gas cylinder is a helium cylinder.

15. The method of claim 11, said method further comprising toggling an on/off switch on said communications device to turn said communications device on.

16. The method of claim 15, wherein said housing assembly comprises a button extension enabled to engage said on/off switch and said step of toggling an on/off switch comprises depressing said button extension.

* * * * *